March 30, 1926.
C. G. TOOTLE
1,578,615
CLUTCH PEDAL RELEASE MECHANISM
Filed July 14, 1925     2 Sheets-Sheet 1
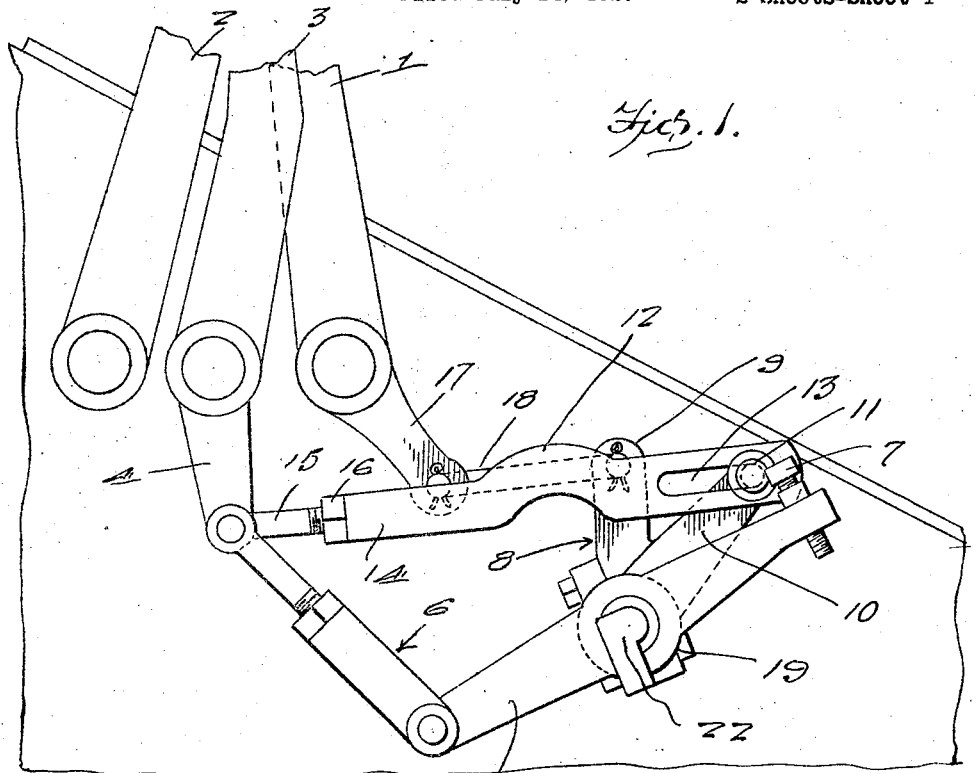
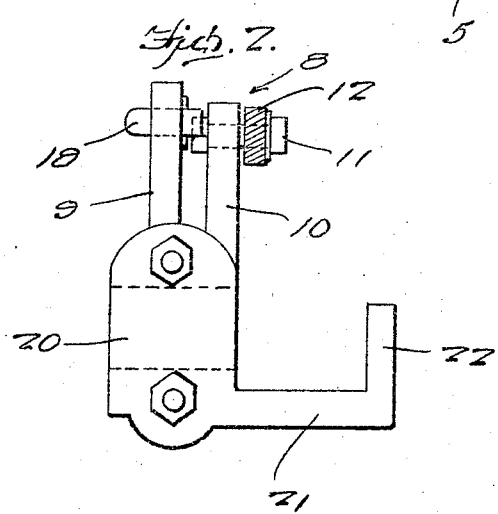
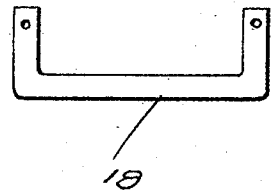
Inventor
C. G. Tootle
By Clarence A. O'Brien
Attorney March 30, 1926. 1,578,615
C. G. TOOTLE
CLUTCH PEDAL RELEASE MECHANISM
Filed July 14, 1925  2 Sheets-Sheet 2
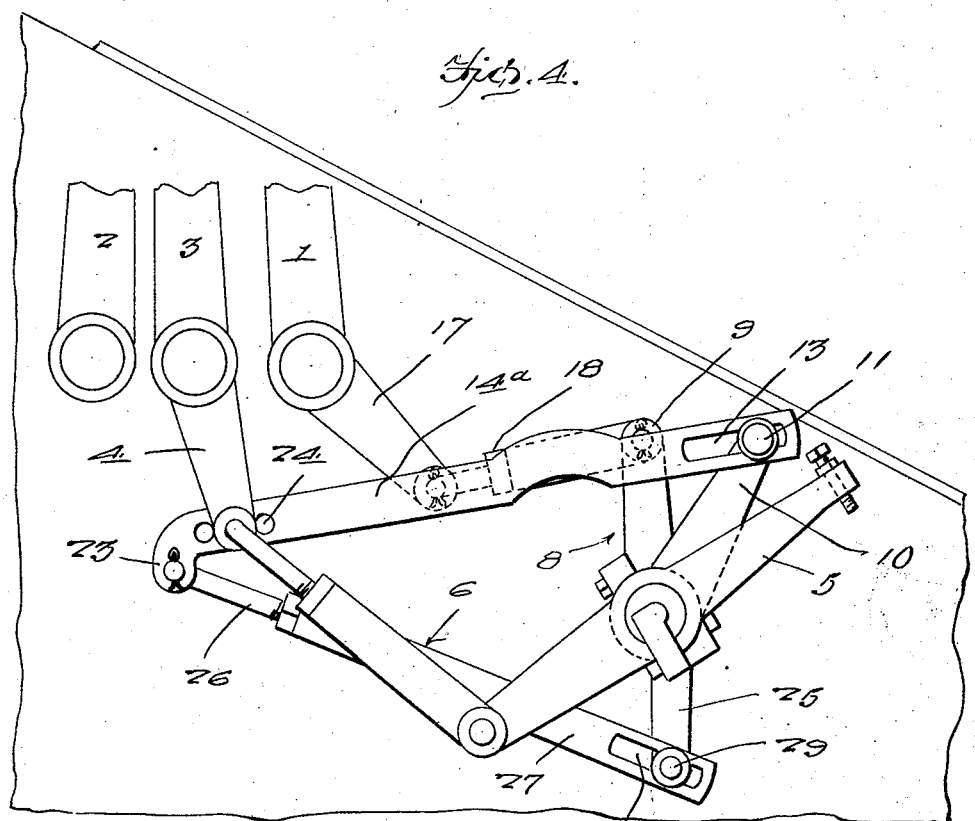
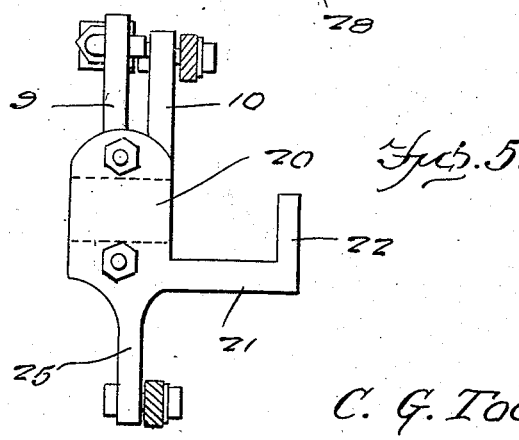
Inventor
C. G. Tootle
By Clarence A. O'Brien
Attorney Patented Mar. 30, 1926.

1,578,615

UNITED STATES PATENT OFFICE.

CURTIS G. TOOTLE, OF ATLANTA, GEORGIA.

CLUTCH-PEDAL-RELEASE MECHANISM.

Application filed July 14, 1925. Serial No. 43,553.

*To all whom it may concern:*

Be it known that I, CURTIS G. TOOTLE, a citizen of the United States, residing at Atlanta, in the county of Fulton and State of Georgia, have invented certain new and useful Improvements in a Clutch-Pedal-Release Mechanism, of which the following is a specification.

This invention has reference to a mechanism which is adapted to be incorporated in the planetary transmission of the kind employed in Ford cars, and it has more particular reference to a novel means for moving the clutch pedal to neutral position automatically when the brake pedal is depressed to apply the brakes.

In the present pedal arrangement on Ford cars, there are three pedals, the brake, the reverse, and the clutch which functions additionally for throwing the transmission into high and low speeds. When applying the brakes, it is necessary to release the clutch, and this means that the operator must place his foot upon the clutch pedal and brake pedal at the same time, forcing the clutch pedal slightly forward to dispose it in neutral position, and completely depressing the brake pedal.

What I propose is a novel mechanism wherein a connection is afforded between the shanks of the brake and clutch pedals so that when the brake pedal is depressed to render it operative, the clutch pedal is automatically moved into neutral.

My principal object is to provide an exceedingly simple and inexpensive arrangement of parts for accomplishing this end in a highly practical and efficient manner without requiring alteration of the stock parts.

Other objects, features, and advantages of the invention will become apparent from the following description and drawing.

In the accompanying drawing forming a part of this application, and in which like numerals are employed to designate like parts throughout the same:

Figure 1 is a side elevational view showing the usual structure together with the improvement associated therewith.

Figure 2 is a section taken approximately upon the plane of the line 2—2 of Figure 1.

Figure 3 is a detail view of a connecting link.

Figure 4 is a view like Figure 1 showing a slightly different embodiment of the invention.

Figure 5 is a view like Figure 2 showing a different embodiment of clamp.

In the drawing, the reference character 1 designates the shank of the usual brake pedal, 2 designates the corresponding part of the intermediate reverse pedal, and 3 designates the same part of the clutch pedal. As customary, the clutch pedal is provided with a depending foot 4 connected with the customary oscillatory lever 5, through the medium of an adjustable connection 6. On its rear end this lever 5 is provided with a customary set screw 7.

The main detail of the improvement is a bell crank 8, the arms 9 and 10 which are offset in the approximate relation indicated in Figure 2. Considering Figure 1 for instance, the rear arm 10 of the bell crank is offset toward the left hand side of the transmission casing, and this arm carries a connecting pin 11. There is an adjustable connection between this pin and the aforesaid depending foot 4. The connection preferably comprising a bar 12 provided with a slot 13 having slidable connection with the pin 11. The intermediate portion of the bar is bowed slightly upward, and the opposite end is formed with a screw threaded socket 14 with which a screw threaded rod 15 has adjustable connection. Obviously, the rod is connected with the foot 4, and a lock nut 16 is provided. Thus, a connection similar to the aforesaid connection 6 is had, except that the bar 12 is slotted.

The shank of the brake pedal carries a depending foot 17, and a connecting link 18 of U-form is connected therewith. The link is shown in Figure 3, and by observing this it will be seen that the laterally directed ends of the same are apertured and extended through openings in the foot 17 and crank arm 9 respectively, cotter pins being passed through the apertures in the link. By offsetting the arms of the bell crank and disposing the link 18 in the position shown, sufficient clearance is provided between the parts to prevent possible binding or interference with easy operation.

The portion 19 of the bell crank is of enlarged form, and is provided with a semi-circular groove for reception of a portion of the usual clutch shaft upon which it is adapted to be clamped. Moreover, as shown in Figure 2, a clamp 20 is bolted to the bell crank and serves to hold it loosely in position on this clutch shaft. The clamp carries a horizontal arm 21 having an upstanding free end portion 22 adapted to extend up into close proximity to the intermediate portion of the aforesaid lever to prevent accidental longitudinal shifting or displacement of the bell crank in one direction.

From the foregoing description it is obvious that when the brake pedal 1 is depressed, the foot 17 is rocked rearwardly, exerting a corresponding thrust upon the forward arm 9 of the bell crank. As the bell crank is thus rocked, it exerts a rearward pull upon the connection provided by the bar 12, and rod 15. This direction of pull moves the clutch pedal forwardly from high speed into neutral position. The parts are accurately proportioned to accomplish this end with a very powerful leverage so that even though the return spring of the high speed pedal must be counteracted, sufficient and strong leverage is provided to accomplish this without undue pressure. It is obvious also that in the event it is desired to push the clutch pedal down or forwardly, this may be done owing to the slotted connection between the same and the bell crank. This type of connection permits this action to take place without effecting any movement whatsoever of the brake pedal. Attention is now called to a slightly different embodiment of the invention shown more plainly in Figures 4 and 5. In connection with these figures, I would state that like reference characters are employed in these two figures as well as the first three figures to designate identical parts. For instance, it will be noted that the bell crank 8 appears here and is provided with the diverging offset arms 9 and 10 respectively. Further, the arm 10 carries a connection pin 11, and there is a connection 18 between the depending part 17 of the brake pedal and the arm 9. The pedals are represented by the same reference characters. This is also true of the parts 5 and 6. In this connection the link is represented by the reference character 14ª, the same having an elongated slot 13 slidably connected with the pin 11. The opposite end of the link however is down turned as indicated at 23 and adjacent this down turned end it is provided with longitudinally spaced holes 24 adjustably connected with the depending leg 4 of the pedal 3. The removable plate 20 of the clamp is provided with the parts 21 and 22, and in addition is provided with a depending extension 25. Then there is an extensible connection between this extension 25 and the down turned end 23 of the aforesaid link.

The extension comprises parts 26 and 27, the last named of which is formed with an elongated slot 28 connected with a lateral pin 29 on the extension 25. The operation of this embodiment of the invention is identical with that before described, the only difference being that the last named construction is more rigid and probably more positive in its action.

It is thought that a careful consideration of the description in connection with the drawings will enable persons skilled in the art to which the invention relates to obtain a clear understanding of the same. Therefore a more lengthy description is thought unnecessary.

While the preferred embodiment of the invention has been shown and described, it is to be understood that minor changes coming within the field of invention claimed may be resorted to if desired.

Having thus described the invention, what I claim as new and desire to secure by Letters Patent is:—

1. In combination, a clutch shaft, a brake pedal, a clutch pedal, a connection between the brake pedal and clutch shaft, a connection between the clutch pedal and the first named connection, said second connection being slidably connected with the first connection, an oscillatory lever mounted on said shaft, and connecting means between the lever and clutch pedal.

2. In combination, a horizontal shaft, a bell crank loosely mounted on said shaft for rocking movement, a pivotally mounted brake pedal, a connection between one arm of the bell crank and said brake pedal, a pivotally mounted clutch pedal, a connection connected at one end with the clutch pedal and slidably connected at its opposite end to the other arm of said bell crank, an oscillatory lever mounted on said clutch shaft, and connecting means between said lever and clutch pedal.

3. As a new manufacture, a bell crank adapted to be mounted for rocking movement upon a clutch shaft, said bell crank including an attaching clamp and a pair of upwardly diverging arms, one of said arms being offset laterally and provided with an angularly directed pin, a link connected to the other arm, said link being adapted to be connected with a brake pedal, and an adjustable connection including a slotted bar, said pin extending slidably through said rod, said bar being adapted to be connected with a clutch pedal.

In testimony whereof I affix my signature.

CURTIS G. TOOTLE.